(12) United States Patent
Kong et al.

(10) Patent No.: US 8,390,934 B2
(45) Date of Patent: Mar. 5, 2013

(54) LIQUID LENS, AND METHOD FOR MANUFACTURING SAME

(75) Inventors: Seong Ho Kong, Yeongcheon-si (KR); Hak-Rin Kim, Daegu (KR); June Kyoo Lee, Daegu (KR)

(73) Assignee: Kyungpook National University Industry-Academic Cooperation Foundation (KR)

( * ) Notice: Subject to any disclaimer, the term of this patent is extended or adjusted under 35 U.S.C. 154(b) by 0 days.

(21) Appl. No.: 13/262,337

(22) PCT Filed: Mar. 25, 2010

(86) PCT No.: PCT/KR2010/001827
§ 371 (c)(1),
(2), (4) Date: Jan. 26, 2012

(87) PCT Pub. No.: WO2010/114254
PCT Pub. Date: Oct. 7, 2010

(65) Prior Publication Data
US 2012/0113525 A1    May 10, 2012

(30) Foreign Application Priority Data

Apr. 1, 2009  (KR) ......................... 10-2009-0028140
Apr. 1, 2009  (KR) ......................... 10-2009-0028141

(51) Int. Cl.
G02B 1/06 (2006.01)
(52) U.S. Cl. .................................................. 359/666
(58) Field of Classification Search .......... 359/665–667; 351/159.68
See application file for complete search history.

(56) References Cited

U.S. PATENT DOCUMENTS

| 7,242,528 B2 * | 7/2007 | Renders et al. ............... 359/665 |
| 7,656,588 B2 | 2/2010 | Bae et al. |
| 2003/0202256 A1 | 10/2003 | Bao et al. |

(Continued)

FOREIGN PATENT DOCUMENTS

| JP | 2001-272646 | 10/2001 |
| JP | 2002-169005 | 6/2002 |

(Continued)

*Primary Examiner* — Joseph P Martinez
(74) *Attorney, Agent, or Firm* — Cantor Colburn LLP

(57) ABSTRACT

Provided is a liquid lens capable of adjusting a focus by using an electrical signal and/or a fluid pressure. The liquid lens includes a container which has a cavity of which the side cross section has a hemispherical shape and contains an insulating liquid droplet and a conductive liquid droplet which are not mixed in the cavity and have the same density, a lower substrate which is combined with a bottom surface of the container to seal a bottom surface of the cavity, and an upper substrate which is combined with a top surface of the container to seal a top surface of the cavity, wherein the container includes an outer wall where the cavity is formed, a first electrode which is formed on an inner side surface of the outer wall and of which the one end is connected to an external power supply, a first insulating film which is laminated a surface of the first electrode and is in contact with the conductive liquid droplet and the insulating liquid droplet, and a second electrode which is laminated on a portion of a surface of the first insulating film and of which the one end is in contact with the conductive liquid droplet and of which the other end is in contact with the external power supply. Accordingly, it is possible to more efficiently adjust a focus by using a small driving voltage by improving a structure of the cavity of the container.

5 Claims, 9 Drawing Sheets

U.S. PATENT DOCUMENTS

2005/0113912 A1 5/2005 Feenstra et al.
2007/0080280 A1* 4/2007 Havens ..................... 250/201.1
2007/0247724 A1 10/2007 Jung

FOREIGN PATENT DOCUMENTS

| | | |
|---|---|---|
| JP | 2002-540464 | 11/2002 |
| JP | 2007-293349 | 11/2007 |
| KR | 10-2004-0084902 | 10/2004 |
| KR | 10-2010-0109729 | 10/2010 |
| KR | 10-2010-0109730 | 10/2010 |

* cited by examiner

LIQUID LENS, AND METHOD FOR MANUFACTURING SAME

TECHNICAL FIELD

The present invention relates to a liquid lens and a method of manufacturing a liquid lens, and more particularly, to a liquid lens capable of adjusting a focus by using an electrical signal or by using an electrical signal and a fluid pressure and a method of manufacturing a liquid lens.

BACKGROUND ART

In general, a lens module of a high-performance digital camera is configured to include an optical lens made of a glass and a lens driving unit for driving the optical lens. In the lens module, a position of the optical lens is adjusted by using the lens driving unit in order to adjust a focus and a magnification ratio of the optical lens.

In this manner, in the conventional high-performance digital camera, since the lens driving unit needs to be installed in order to adjust the focus and magnification, the size of the digital camera is inevitably increased, and it is difficult to miniaturize the high-performance digital camera.

Therefore, recently, a liquid lens capable of adjusting the focus and magnification ratio of the lens without using a lens driving unit has been developed. Due to an electrowetting phenomenon, the focal length of the liquid lens is controlled by adjusting a curvature of a liquid droplet. The principle of the electrowetting is described with reference to FIG. 1. FIG. 1 is a view illustrating a conductive liquid droplet as an example in order to explain the principle of the electrowetting. As illustrated in FIG. 1, if a conductive liquid droplet 40 having a diameter of 2 mm or less is dropped on a top surface of the insulating film 14 which is electrically insulated, a sphere is formed as illustrated by a solid line in FIG. 1. If a voltage is applied between a first electrode 13 disposed under the insulating film 14 and a second electrode 15 interposing the conductive liquid droplet, the electrowetting phenomenon occurs as illustrated by a dotted line in FIG. 1. In other words, if a contact angle between the conductive liquid droplet 40 and the top surface of the insulating film 13 in the state where a voltage is not applied (V=0) is denoted by $\theta_1$ and the contact angle in the state where the voltage is applied is denoted by $\theta_2$, the formula '$\theta_1 > \theta_2$' is satisfied. In this manner, the electrowetting phenomenon denotes a phenomenon where the contact angle is changed when the voltage is applied to the conductive liquid droplet 40 between the first electrode 13 and the second electrode 15. The contact angle is an intrinsic value determined according to characteristics of a liquid droplet, a material such as another liquid or air surrounding the liquid droplet, and a material of the top surface of the insulating film 14. Herein, the diameter of the conductive liquid droplet 40 is limited to 2 mm or less in order to allow the liquid droplet to be predominantly influenced by a surface tension rather than gravity.

FIGS. 2 and 3 are cross-sectional views illustrating conventional liquid lenses. Referring to FIGS. 2 and 3, the focus and magnification of the liquid lens can be adjusted by using the electrowetting phenomenon described above without using a lens driving unit.

In the liquid lens illustrated in FIG. 2, a cylindrical cavity is formed due to vertical side walls, and the conductive liquid droplet 40 and the insulating liquid droplet 50 are contained in the cavity. The liquid lens having a cylindrical cavity described above has an advantage in that the conductive liquid droplet and the insulating liquid droplet contained in the cavity can be stably protected from an external impact. However, the liquid lens has a problem in that it is difficult to inject the conductive liquid droplet and the insulating liquid droplet.

In the liquid lens illustrated in FIG. 3, a truncated conical cavity of which are slanted at an angle of 45° is formed, and the conductive liquid droplet and the insulating liquid droplet are contained in the cavity. In the liquid lens having a truncated conical cavity, it is easy to inject the liquid droplets in comparison with the liquid lens having a cylindrical cavity described above. However, the liquid lens having a truncated conical cavity has a problem in that the liquid droplets contained in the cavity is vulnerable to an external impact in comparison with the liquid lens having a cylindrical cavity.

In addition, a conventional liquid lens is manufactured by using a manufacturing method using a glass or a metal for the container. However, this manufacturing method has a limitation in more precisely manufacturing the cavity of the container.

DISCLOSURE

Technical Problem

The present invention is to provide a liquid lens capable of allowing a liquid droplet to be easily injected into a cavity, being invulnerable to an external impact, and efficiently adjusting a focus by using lower voltage by improving a structure of a cavity of a container.

The present invention is to provide a liquid lens capable of adjusting a focus in a wider range by adding a lens focus adjusting unit using a fluid pressure.

The present invention is to provide a method of manufacturing a liquid lens capable of forming a precision structure of a container and performing mass production by using a semiconductor processing technique.

Technical Solution

According to a first aspect of the present invention, there is provided a liquid lens capable of adjusting focus based on an electrical signal, including: a container which has a cavity of which the side cross section has a hemispherical shape and contains an insulating liquid droplet and a conductive liquid droplet which are not mixed in the cavity and have the same density; a lower substrate which is combined with a bottom surface of the container to seal a bottom surface of the cavity of the container; and an upper substrate which is combined with a top surface of the container to seal a top surface of the cavity of the container, wherein the container includes an outer wall where the cavity is formed, a first electrode which is formed on an inner side surface of the outer wall and of which the one end is connected to an external power supply, a first insulating film which is laminated a surface of the first electrode and is in contact with the conductive liquid droplet and the insulating liquid droplet, and a second electrode which is laminated on a portion of a surface of the first insulating film and of which the one end is in contact with the conductive liquid droplet and of which the other end is in contact with the external power supply, and wherein focus adjustment is performed by deformation in a shape of an interface between the insulating liquid droplet and the conductive liquid droplet contained in the cavity in response to a voltage applied from the external power supply through the first electrode and the second electrode.

In the above first aspect, the electrowetting voltage required at the time of focus adjustment of the liquid lens may be lower than that for the liquid lens having a cylindrical or truncated conical cavity.

In the above first aspect, it is preferable that the curvature of the inner side surface of the outer wall where the cavity of the container is formed is defined as a value so that the meniscus of the insulating liquid droplet and the conductive liquid droplet is minimized. In addition, it is preferable that the amount ratio of the conductive liquid droplet and the insulating liquid droplet contained in the container is defined as a value so that the meniscus of the insulating liquid droplet and the conductive liquid droplet is minimized.

In the above first aspect, it is preferable that the container further includes a second insulating film interposed between the inner side surface of the outer wall and the first electrode.

In the above first aspect, it is preferable that the container includes a hydrophobic film which is formed on a contact surface between the first insulating film and the insulating liquid droplet and a contact surface between the first insulating film and the conductive liquid droplet.

According to a second aspect of the present invention, there is provided a method of manufacturing a liquid lens capable of adjusting focus based on an electrical signal, including steps of: (a) producing a container having a hemispherical cavity; (b) producing a lower substrate which is combined with a bottom surface of the container to seal a bottom surface of the cavity; (c) producing an upper substrate which is combined with a top surface of the container to seal a top surface of the cavity; and (d) sealing the bottom surface of the cavity by combining the lower substrate to the bottom surface of the container, injecting the insulating liquid droplet and the conductive liquid droplet into the cavity of the container, and sealing the top surface of the cavity by combining the upper substrate to the top surface of the container, wherein the step (a) includes steps of: forming an outer wall having a hemispherical cavity; forming a first electrode on an inner side surface of the outer wall so as to be connected to the external power supply; forming a first insulating film on a surface of the first electrode; and forming a second electrode on a portion of a surface of the first insulating film.

In the above second aspect, it is preferable that the step (a) includes steps of: (a1) forming silicon oxide films on both sides of a first semiconductor substrate; (a2) forming an outer wall of which the side cross section has a hemispherical shape by etching a central area of the first semiconductor substrate by using an isotropic etchant while stirring; (a3) removing the silicon oxide films and forming a first electrode by coating an inner side surface of the outer wall with a conductive film; (a4) forming a first insulating film on the first electrode; and (a5) forming a second electrode on a portion of a surface of the first insulating film.

In the above second aspect, it is preferable that in the step (a2), a composition ratio of the isotropic etchant and a method and intensity of the stirring are adjusted so that the shape of the side cross section of the cavity has the curvature where the meniscus of the conductive liquid droplet and the insulating liquid droplet is minimized.

In the above second aspect, it is preferable that a step of removing all of the silicon oxide films and forming an insulating film for preventing leakage on an inner side surface of the outer wall is further included between the step (a2) and the step (a3).

In the above second aspect, it is preferable that a step of forming a hydrophobic film on an area of the first insulating film where is in contact with the insulating liquid droplet and the conductive liquid droplet is further included between the step (a4) and the step (a5).

According to a third aspect of the present invention, there is provided a liquid lens capable of adjusting focus based on an electrical signal, including: a container which has a cavity of which the side cross section has a hemispherical shape and contains an insulating liquid droplet and a conductive liquid droplet which are not mixed in the cavity and have the same density; a fluid pressure plate where a fluid pressure passage are formed on a surface thereof and which is combined with a bottom surface of the container so that the fluid pressure passage is disposed on a bottom surface of the cavity of the container; and an upper substrate which is combined with a top surface of the container to seal a top surface of the cavity of the container, wherein the container includes an outer wall where the cavity is formed, a first electrode which is formed on an inner side surface of the outer wall and of which the one end is connected to an external power supply, and a first insulating film which is laminated on a surface of the first electrode and is in contact with the conductive liquid droplet and the insulating liquid droplet, and wherein a second electrode are formed on a surface of a fluid pressure passage of a fluid pressure plate and focus adjustment is performed by deformation in a shape of an interface between the insulating liquid droplet and the conductive liquid droplet contained in the cavity in response to a voltage applied from the external power supply through the first electrode and the second electrode and a pressure exerted through the fluid pressure passage.

According to a third aspect of the present invention, there is provided a method of manufacturing a liquid lens capable of adjusting focus based on an electrical signal, including steps of: (a) producing a container having a hemispherical cavity; (b) producing a fluid pressure plate where a fluid pressure passage is formed on the surface thereof and a second electrode is formed on the central region of the surface of a fluid pressure plate; (c) producing an upper substrate which is combined with a top surface of the container to seal a top surface of the cavity; and (d) sealing the bottom surface of the cavity by combining the fluid pressure plate to a bottom surface of the container so that the fluid pressure passage is disposed on the bottom surface of the cavity, injecting the insulating liquid droplet and the conductive liquid droplet into the cavity of the container, and sealing the top surface of the cavity by combining the upper substrate to the top surface of the container, wherein the step (a) includes steps of: forming an outer wall having a hemispherical cavity; forming a first electrode on an inner side surface of the outer wall to be connected to an external power supply; and forming a first insulating film on a surface of the first electrode.

Advantageous Effects

As described above, according to the liquid lens according to the present invention, the cavity containing the liquid droplet is formed to have a hemispherical shape, so that it is possible to minimize voltage consumption and to efficiently adjust a focus.

In addition, according to the liquid lens according to the present invention, the fluid pressure passage is formed on the lower substrate, and the shapes of the liquid droplets contained in the cavity and the upper substrate is deformed in response to the fluid pressure applied through the fluid pressure passage, so that focus adjustment can be performed by adjusting the voltage and the fluid pressure. Accordingly, it is possible to adjust a focus in a wider range.

In addition, according to the method of manufacturing the liquid lens according to the present invention, the container containing the liquid droplets is produced by using a semiconductor process, so that it is possible to manufacture a liquid lens having a more precise container and to easily perform mass production in comparison with a conventional method of manufacturing a liquid lens.

BEST MODE

Hereinafter, a structure of a liquid lens according to a first embodiment of the present invention and a manufacturing method thereof will be described in detail with reference to the accompanying drawings.

Figure 4:
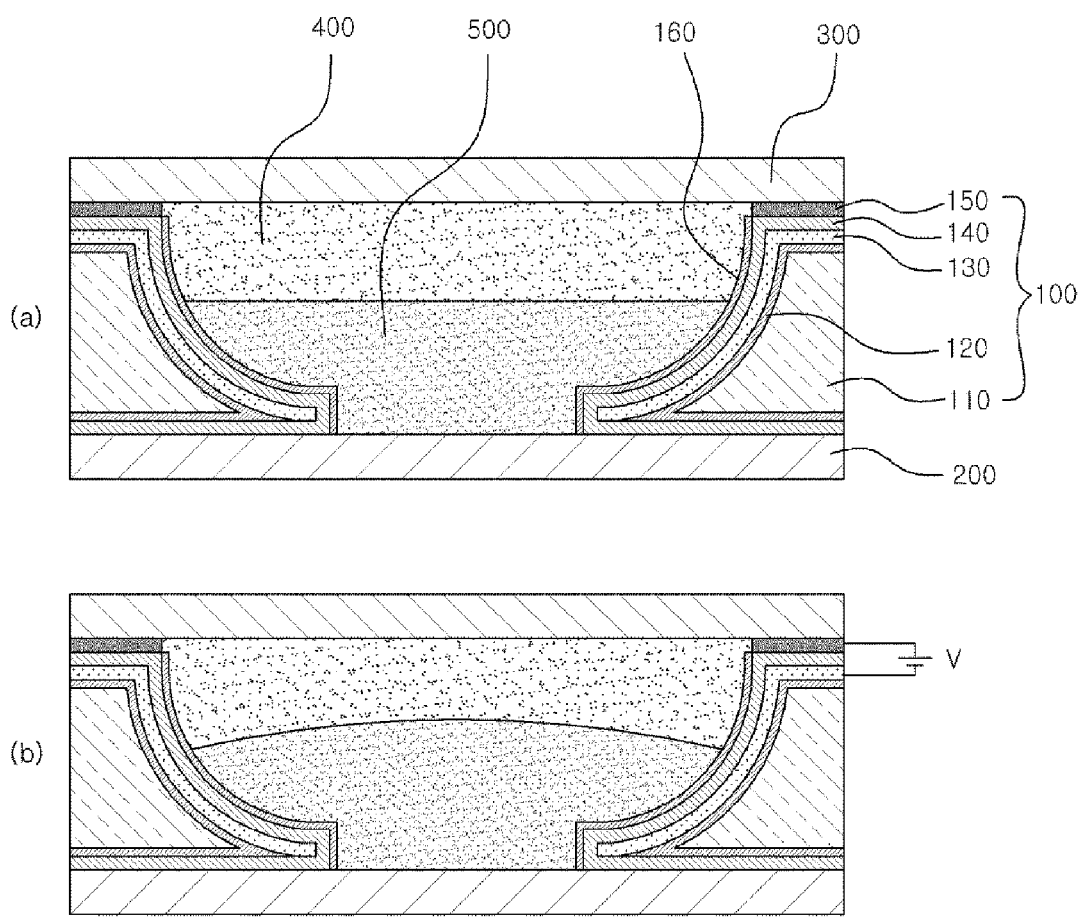
FIG. 4 is a cross-sectional view illustrating a liquid lens according to a first embodiment of the present invention.

FIG. 4 is a cross-sectional view illustrating a structure of a liquid lens according to the first embodiment of the present invention.

Referring to FIG. 4, the liquid lens 1 according to the embodiment includes a container 100, a lower substrate 200, and an upper substrate 300. The liquid lens 1 is configured so that a conductive liquid droplet 400 and an insulating liquid droplet 500 are contained in a cavity of the container 100 and the cavity of the container is sealed by the upper substrate 300 and the lower substrate 200. The focus is changed according to a deformation in shapes of the conductive liquid droplet and the insulating liquid droplet contained in the cavity in response to electrical signals applied through electrodes of the container, so that the liquid lens has a function as a variable focus lens. Herein, (a) of FIG. 4 illustrates a shape of the interface between the conductive liquid droplet 400 and the insulating liquid droplet 500 in the state where a voltage is not applied, and (b) of FIG. 4 illustrates a shape of the interface between the conductive liquid droplet 400 and the insulating liquid droplet 500 in the state where a voltage is applied.

The container 100 has a cavity of which the side cross section has a hemispherical shape inside thereof. The insulating liquid droplet 500 and the conductive liquid droplet 400 which are not mixed and have the same density are contained in the cavity. The container 100 includes an outer wall 110 constituting the cavity, a second insulating film 120 formed on an inner side surface of the outer wall, a first electrode 130 which is formed on the second insulating film of which the one end is connected to an external power supply, a first insulating film 140 which is laminated on a surface of the first electrode 130 and is in contact with the conductive liquid droplet 400 and the insulating liquid droplet 500, and a second electrode 150 which is laminated on a portion of a surface of the first insulating film 140 and of which the one end is in contact with the conductive liquid droplet 400 and of which the other end is connected to the external power supply (V).

The second insulating film 120 prevents a voltage applied to the first electrode 130 from being leaked into the outer wall 110. In addition, the container 100 includes a hydrophobic film 160 on a contact surface between the first insulating film 140 and the insulating liquid droplet 500 and a contact surface between the first insulating film 140 and the conductive liquid droplet 400. The hydrophobic film 160 is formed on regions of the surface of the first insulating film 140, which are in contact with the liquid droplets 400 and 500. The hydrophobic film 160 has a function of preventing the liquid droplets 400 and 500 from being infiltrated into the first insulating film 140 and a function of maintaining appropriate contact force with respect to the contained liquid droplets 400 and 500. Herein, the contact angles with respect to the liquid droplets 400 and 500 are varied according to a type of the hydrophobic film used. Herein, the hydrophobic film 160 may be formed by Teflon coating.

(a) of FIG. 4 illustrates the state where a voltage is not applied between the first electrode 130 and the second electrode 150, and (b) of FIG. 4 illustrates the state where a voltage is applied between the first electrode 130 and the second electrode 150. The deformation in shapes of the conductive liquid droplet 400 and the insulating liquid droplet 500 illustrated in (b) of FIG. 4 occurs due to the electrowetting phenomenon described above in the section BACKGROUND.

Figure 1:
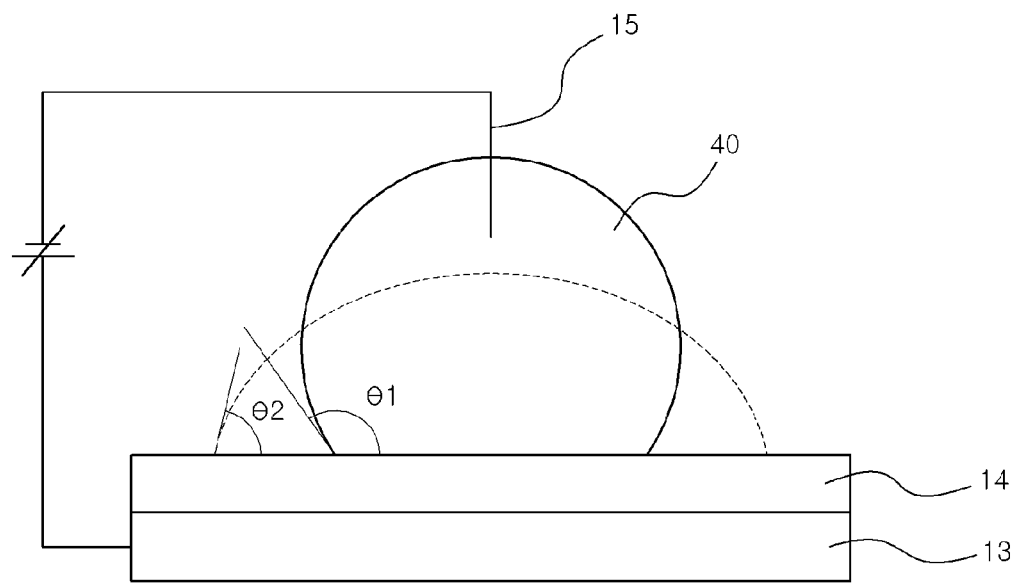
FIG. 1 is a view for explaining an electrowetting phenomenon applied to a conventional liquid lens.
Figure 2:
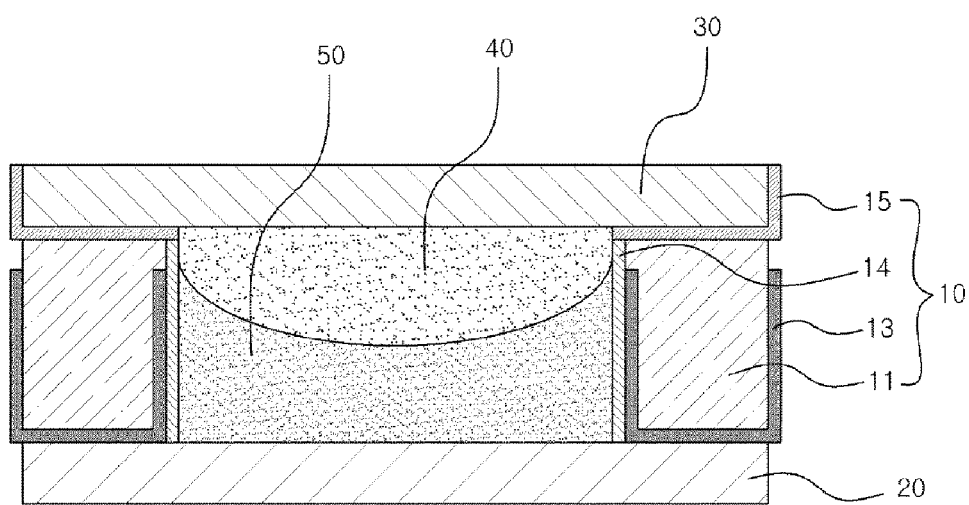
FIGS. 2 and 3 are schematic side cross-sectional views for explaining a conventional liquid lens.
Figure 3:
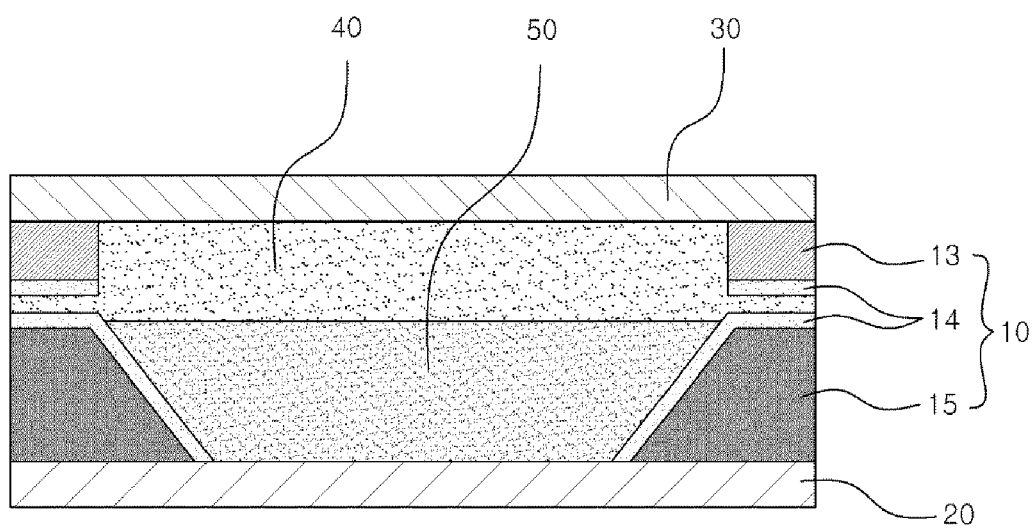
Figure 5:
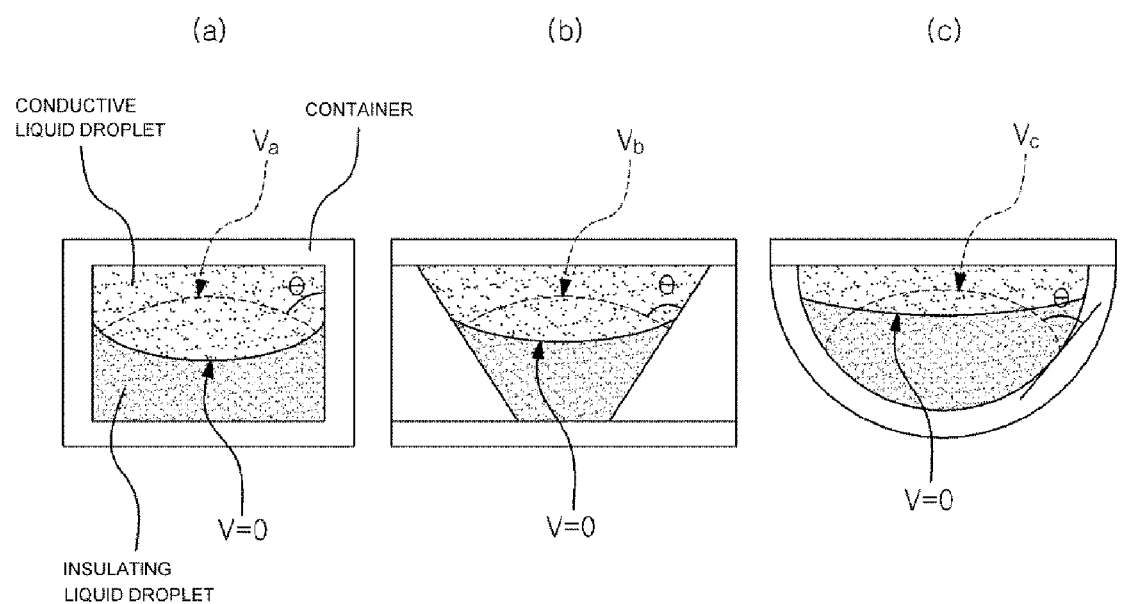
FIG. 5 is a view comparing applied voltages of a hemispherical cavity according to a first embodiment of the present invention and conventional cylindrical and truncated conical cavities.

The cavity is formed in the container 100 so that the side cross section thereof has a hemispherical shape. Therefore, in the case where the insulating liquid droplet 500 and the conductive liquid droplet 400 are contained in the cavity, the interface between the insulating liquid droplet and the conductive liquid droplet is in contact with the surface of the hemispherical cavity. This feature is distinguished from the feature of the conventional liquid lens 1 illustrated in FIGS. 1 and 2. As illustrated in FIG. 1 and FIG. 2, the interface between the insulating liquid droplet 50 and the conductive liquid droplet 40 is in contact with a planar surface. Therefore, the meniscus of the liquid droplets 40 and 50 contained in the cavity of the conventional cylindrical or truncated conical liquid lens illustrated in FIGS. 1 and 2 is larger than the meniscus of the liquid droplets 400 and 500 contained in the cavity of the liquid lens 1 according to the present invention. As the meniscus of the liquid droplets 400 and 500 is decreased as seen from the cavity of the container 100, the electrowetting voltage necessary for forming a convex lens is decreased. Therefore, in the liquid lens 1 according to the present invention, in comparison with the conventional liquid lens illustrated in FIGS. 1 and 2, it is possible to reduce the voltage consumption for adjusting the focus of the lens. This effect is described in detail with reference to FIG. 5. In order to secure the same change in focal length, in case of a cylindrical cavity as illustrated in (a) of FIG. 5, a voltage Va is necessary; in case of a truncated conic cavity as illustrated in (b) of FIG. 5, a voltage Vb is necessary; and in case of a semispherical cavity as illustrated in (c) of FIG. 5, a voltage Vc is necessary. The magnitudes of the voltages applied to secure the same change in focal length have the relationship of Va>Vb>Vc. In this manner, in the case where the cavity of the container has a hemispherical shape according to the present invention, it can be understood that the lowest voltage is applied.

The curvature of the inner side surface of the cavity of the container 100 according to the present invention is defined to be the value where the meniscus of the insulating liquid droplet 500 and the conductive liquid droplet 400 is minimized.

Figure 6:
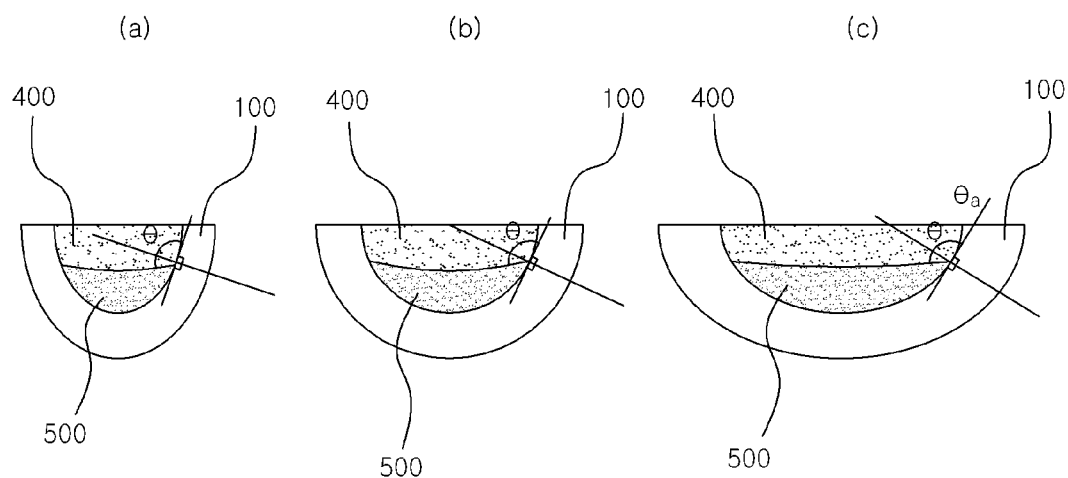
FIG. 6 is a view for explaining a change in a meniscus according to a change in curvature of the hemispherical cavity according to the first embodiment of the present invention.

A change of the meniscus according to a change in the curvature of the cavity of the container 100 according to the first embodiment of the present invention is schematically described with reference to FIG. 6. The initial contact angle of the liquid droplets 400 and 500 according to a shape of the cavity containing the liquid droplets 400 and 500 can be indicated by the angle θ formed by a tangential line at a boundary point between the two liquid droplets 400 and 500 and an interface between the two liquid droplets 400 and 500. As illustrated in FIG. 6, in the case where the cavities have the same height and the curvature radii thereof are increased as it goes from (a) of FIG. 6 to (c) of FIG. 6, the larger the curvature radius, the smaller the meniscus of the liquid droplets 400 and 500 as seen from the cavity. This is because the contact angle θ formed by the interface between the liquid droplets and the tangential line is constant as an intrinsic value according to the contacting materials and the contact angle of the liquid droplets as seen from the cavity is actually decreased by the difference, that is, the separated angle θa between the tangential line and the cavity. Herein the cavity illustrated in (c) of FIG. 6 has the smallest meniscus. However, it may not preferable that the curvature radius is configured to be too increased so as to decrease the meniscus. This is because, as the curvature radius is increased, it is relatively difficult to maintain the centers of the liquid droplets 400 and 500.

The amount ratio of the conductive liquid droplet and the insulating liquid droplet contained in the cavity of the container 100 according to the embodiment is defined by a value where the meniscus of the contained insulating liquid droplet and the contained conductive liquid droplet is minimized. This is because, in the case where the meniscus is minimized, an electrowetting voltage applied between the first electrode 130 and the second electrode 150 for focus adjustment is decreased, so that voltage consumption can be reduced.

Figure 7:
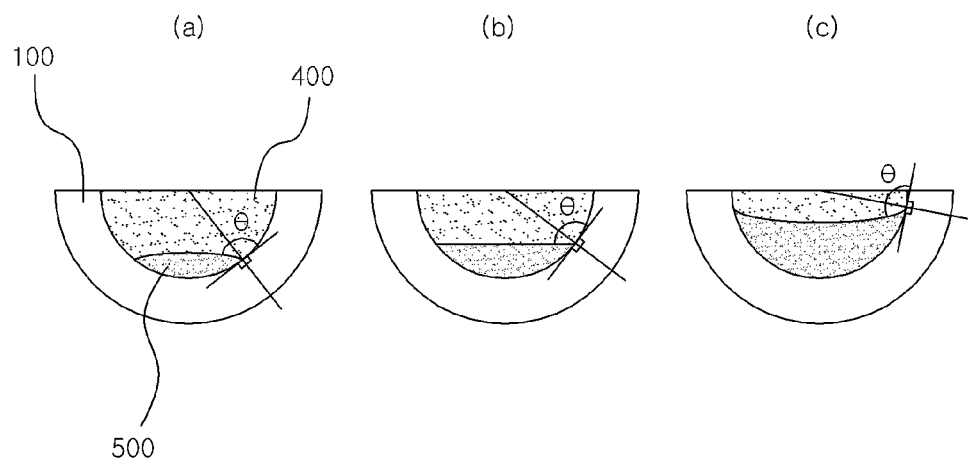
FIG. 7 is a view for explaining a change in meniscus according to a change in ratio of the hemispherical conductive liquid droplet and the insulating liquid droplet contained in the cavity according to the first embodiment of the present invention.

A change of the meniscus according to a change in the amount ratio of the contained liquid droplets 400 and 500 will be described with reference to FIG. 7. In FIG. 7, the change of the meniscus according to a change in the amount ratio of the liquid droplets 400 and 500 in the state where the applied voltage is '0' occurs since the cavity of the container 100 according to the embodiment has a hemispherical shape, which is one of the important features of the present invention. FIG. 7 illustrates results of measurement of the angle θ formed by the tangential line at the boundary point between the conductive liquid droplet 400 and the insulating liquid droplet 500 contained in the hemispherical cavity and the interface between the two liquid droplets 400 and 500 according to a change in the amount ratio of the liquid droplets 400 and 500. Herein, the contact angle θ formed by the interface between the liquid droplets 400 and 500 and the tangential line is constant as an intrinsic value according to the containing materials. In (b) of FIG. 7 where the interface is flattest, the meniscus is smallest, and the electrowetting voltage applied for focus adjustment is smallest.

In this manner, the liquid lens 1 according to the first embodiment is configured so that the cavity containing the liquid droplets 400 and 500 is formed to have a hemispherical shape, so that it is possible to minimize voltage consumption and to efficiently adjust focus. In addition, the cavity is formed to have a hemispherical shape, so that it is possible to change the magnitude of the electrowetting voltage for focus adjustment by controlling the curvature of the cavity and the amount ratio of the contained conductive liquid droplet 400 and the contained insulating liquid droplet 500 according to user's convenience.

Hereinafter, a method of manufacturing the liquid lens according to the first embodiment of the present invention will be described in detail with reference to FIG. 8.

First, the liquid lens 1 is manufactured by a step of forming a container 100 in which a cavity 'C' is formed, a lower substrate 200, and an upper substrate 300, a step of sealing a lower portion of the cavity by combining the lower substrate 200 to a bottom surface of the container, a step of injecting an insulating liquid droplet 500 and a conductive liquid droplet 400 into the cavity of the container 100; and a step of sealing an upper portion of the cavity by combining the upper substrate 300 to a top surface of the container 100.

The method of manufacturing the liquid lens 1 according to the first embodiment of the present invention will be described with reference to FIG. 8. Herein, in the method of manufacturing the liquid lens 1, a semiconductor manufacturing process is used. (a) to (e) of FIG. 8 illustrate process for manufacturing the container 100; (f) of FIG. 8 illustrates a process for adhering the lower substrate 200; and (g) of FIG. 8 illustrates a process of adhering the upper substrate 300.

Figure 8:
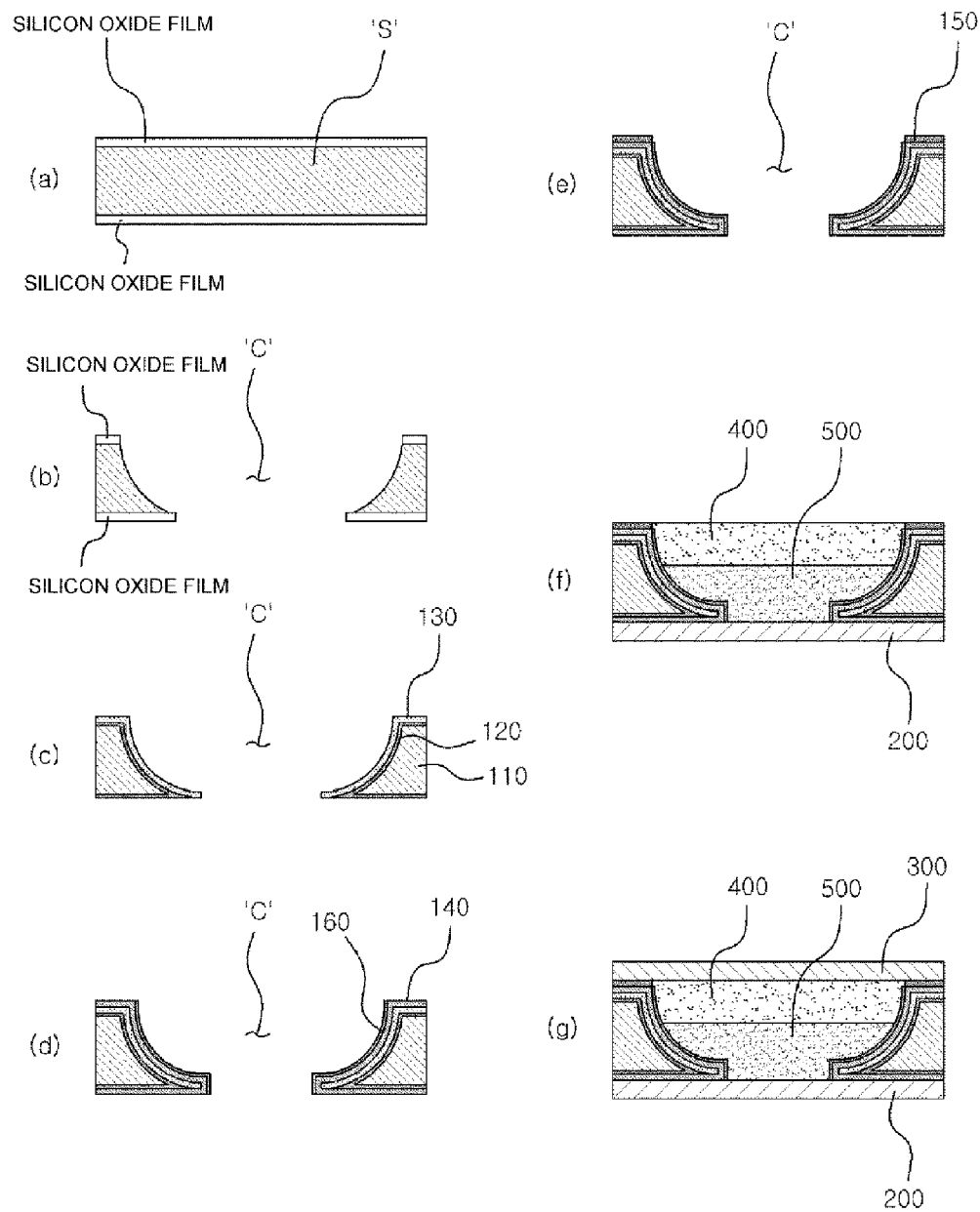
FIG. 8 illustrates cross-sectional views of a sequence of processes for manufacturing the liquid lens according to the first embodiment of the present invention.

First, as illustrated in (a) of FIG. 8, silicon oxide films ($SiO_2$) are formed on both sides of a first semiconductor substrate 'S'. Next, by etching the central region of the first semiconductor substrate 'S' where the silicon oxide films are formed by using an isotropic etchant while stirring, an outer wall 110 which is penetrated by a hemispherical cavity 'C' is formed as illustrated in (b) of FIG. 8. Herein, in the case of wet etching, the isotropic etchant may be made by using HNA (Hydrofluoric acid:Nitric acid:Acetic acid=1:3:8). A desired curvature of the hemispherical cavity is obtained by adjusting a ratio of a mixture of etchants or a degree of stirring. In addition, an isotropic dry etching method using a gas such as 'xenon difluoride ($XeF_2$)' may be used.

Next, as illustrated in (c) of FIG. 8, after the all of silicon oxide films are removed from the outer wall 110 where the cavity 'C' is formed, a second insulating film 120 is formed on an inner side surface of the outer wall 110, and a first electrode 130 is formed by forming a conductive film on the top surface of the second insulating film 120 by using a material having an electrically conductive property. Next, as illustrated in (d) of FIG. 8, a first insulating film 140 is formed on a top surface of the first electrode 130, and a hydrophobic film 160 is formed on a surface of the first insulating film 140 which is to be in contact with the liquid droplets 400 and 500. Next, as illustrated in (e) of FIG. 8, a second electrode 150 is formed by forming a conductive film in a region of the surface of the first insulating film 140, where the hydrophobic film is not formed, by using a material having an electrically conductive property. (e) of FIG. 8 illustrates a cross section of the container 100 manufactured according to the embodiment.

Next, as illustrated in (f) of FIG. 8, the lower substrate 200 having high light transmittance such as a glass is prepared, and the lower portion of the cavity is sealed by adhering the lower substrate 200 to the bottom surface of the container 100. Next, the insulating liquid droplet 500 and the conductive liquid droplet 400 are sequentially injected into the cavity of the container 100 to which the lower substrate 200 is adhered. Next, as illustrated in (e) of FIG. 8, the top surface of the cavity is sealed by adhering the upper substrate 300 having high light transmittance to the top surface of the container 100. Therefore, as illustrated in (g) of FIG. 8, the liquid lens 1 according to the first embodiment can be manufactured by using a semiconductor process.

In this manner, in the method of manufacturing the liquid lens according to the first embodiment of the present invention, the container 100 having the cavity 'C' containing the liquid droplets 400 and 500 is manufactured by using a semiconductor process, so that it is possible to manufacture the liquid lens 1 having the more precise container 100 and to more easily perform mass production in comparison with a conventional manufacturing method using a glass or a metal.

Mode for Invention

Figure 9:
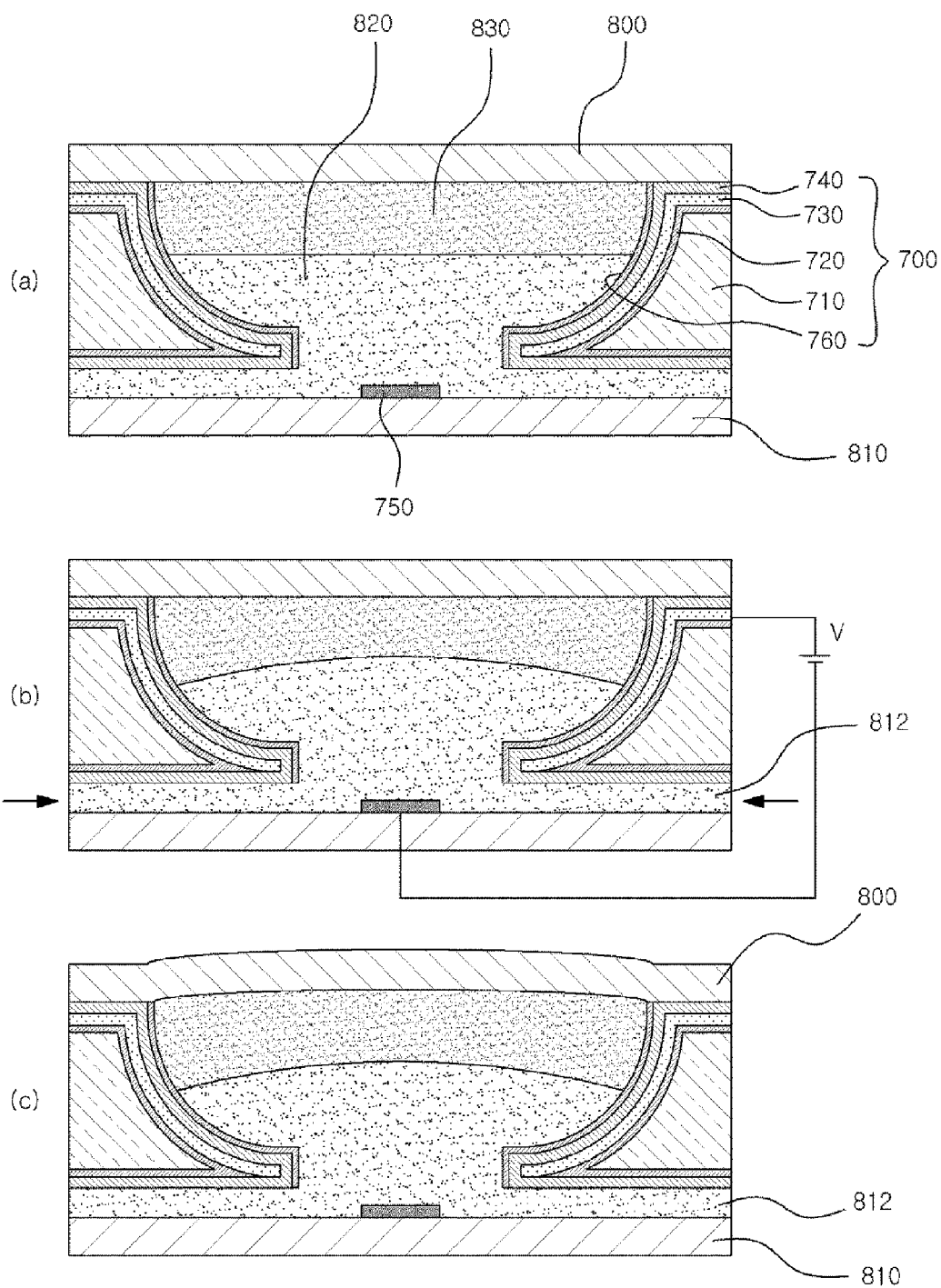
FIG. 9 is a cross-sectional view illustrating a liquid lens according to a second embodiment.

Hereinafter, a structure of a liquid lens according to a second embodiment and a method of manufacturing the liquid lens will be described in detail with reference to the accompanying drawings. FIG. 9 is a cross-sectional view illustrating the liquid lens according to the second embodiment.

As illustrated in FIG. 9, the liquid lens 1 according to the embodiment includes a container 700, a fluid pressure plate 810, and an upper substrate 800. A conductive liquid droplet 820 and an insulating liquid droplet 830 are contained in a cavity of the container 700. The upper and lower portions of the cavity are sealed with the upper substrate 800 and the fluid pressure plate 810. The liquid lens 1 has a function of variable focus lens of which the focus is varied according to a deformation in shapes of the contained liquid droplets 820 and 830 in response to an externally applied electrical signal. In addition, the shapes of the contained liquid droplets can be additionally varied by exerting external pressure to the liquid droplets contained in the container 700 through a fluid pressure passage 812 formed on the fluid pressure plate 810, so that the range of the focus adjustment of the liquid lens 1 can be widened.

Herein, (a) of FIG. 9 illustrates a shape of the interface between the conductive liquid droplet and the insulating liquid droplet in the state where a voltage is not applied, and (b) of FIG. 9 illustrates a deformation in the shape of the interface between the conductive liquid droplet and the insulating liquid droplet in the state where a voltage is not applied. In addition, (c) of FIG. 9 illustrates a deformation in the shapes of the upper substrate 800 and the liquid droplets 830 and 820 in the state where external pressure is exerted through the fluid pressure passage 812.

As illustrated in FIG. 9, the container 700 has the cavity of which the side cross section has a hemispherical shape, and the insulating liquid droplet and the conductive liquid droplet which are not mixed and have the same density are contained in the cavity. The configurations of the container 700 and the upper substrate 800 are the same as those of the first embodiment, and thus, the description thereof is omitted. However, the container according to this embodiment does not include a second electrode.

Figure 10:
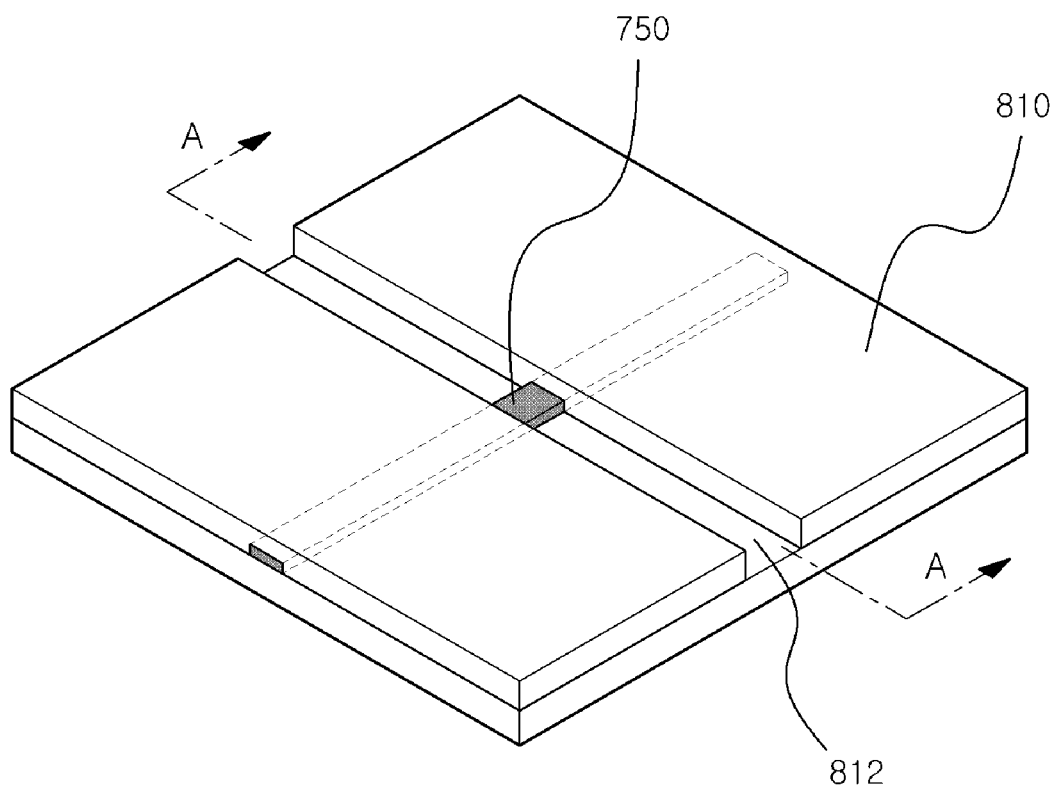
FIG. 10 is a perspective view illustrating a fluid pressure plate used for the liquid lens according to the second embodiment, where a fluid pressure passage and a second electrode are formed.

FIG. 10 is a perspective view illustrating a fluid pressure plate 810 of the liquid lens according to the second embodiment. Referring to FIG. 10, the fluid_pressure plate 810 according to the present invention includes a fluid pressure passage 812 which functions as a passage for transferring an externally applied pressure to the liquid droplets in the cavity and a second electrode 750 which is formed in the central area of the surface of the fluid pressure passage. It is preferable that the second electrode is configured as a transparent electrode. The fluid pressure plate is disposed so that the fluid pressure passage is engaged with the lower portion of the cavity, and the fluid pressure plate is engaged with the container so that the lower portion of the cavity is sealed. In other words, the bottom surface of the container is sealed by engagement with the fluid pressure plate, and external pressure is exerted through the fluid pressure passage. The second electrode formed on the surface of the fluid pressure passage of the fluid pressure plate comes in contact with the conductive liquid droplet contained in the cavity.

The focus adjustment of the liquid lens 1 according to the second embodiment can be performed by the voltage applied through the first electrode 730 and the second electrode 750 and the external pressure applied through the fluid pressure passage 812. The focus adjustment of the liquid lens 1 according to the first embodiment of the present invention can be performed by only the voltage. However, the focus adjustment of the liquid lens 1 according to the second embodiment can be performed by the fluid pressure as well as the voltage. In the case where voltages are applied to the first electrode 730 and the second electrode 750, as illustrated in (b) of FIG. 9, the shape of the liquid droplet is deformed convexly. Therefore, it is possible to adjust the focus of the lens in response to the voltage applied to the liquid lens 1 according to the embodiment.

(c) of FIG. 9 illustrates an additional deformation of the shape of the liquid droplet, which is changed by the voltage as illustrated in (b) of FIG. 9, by using the fluid pressure exerted through the fluid pressure passage 812. In addition, besides a deformation of the liquid droplet, a deformation of the upper substrate 800 also occurs. As illustrated in (c) of FIG. 9, the central surface of the upper substrate 800 is expanded in a convex shape in response to the fluid pressure exerted through the fluid pressure passage 812. Therefore, the upper substrate 800 according to the embodiment is produced in a shape of an elastic film by using a polymer having high light transmittance, that is, in a shape of an elastic polymer membrane. Herein, the upper substrate 800 is produced by using PDMS (polydimethylsiloxane).

In this manner, the liquid lens 1 according to the embodiment is configured so that the cavity containing the liquid droplets is formed to have a hemispherical shape, so that it is possible to minimize voltage consumption and to efficiently adjust focus. In addition, in the liquid lens 1 according to the embodiment, since the liquid droplets and the upper substrate can be deformed by the fluid pressure exerted through the fluid pressure passage 812, it is possible to more precisely adjust focus and to increase the range of focus adjustment by controlling the fluid pressure exerted through the fluid pressure passage 812 as well as the voltage applied between the first electrode 730 and the second electrode 750.

Hereinafter, the method of manufacturing the liquid lens according to the second embodiment will be described in detail with reference to FIG. 11. The method of manufacturing the liquid lens according to the second embodiment mainly includes a process for producing the container 700, a process for producing the fluid pressure plate 810 where the fluid pressure passage 812 and the second electrode are formed, a process for sealing the bottom surface of the cavity of the container by adhering the fluid pressure plate to the bottom surface of the container and allowing the insulating liquid droplet 830 and the conductive liquid droplet 820 to be sequentially contained in the cavity, and a processing for producing the upper substrate 800 which is to be adhered to the top surface of the container 700 and sealing the top surface of the cavity by adhering the upper substrate 800 to the top surface of the container. Hereinafter, the processes are described in detail.

Figure 11:
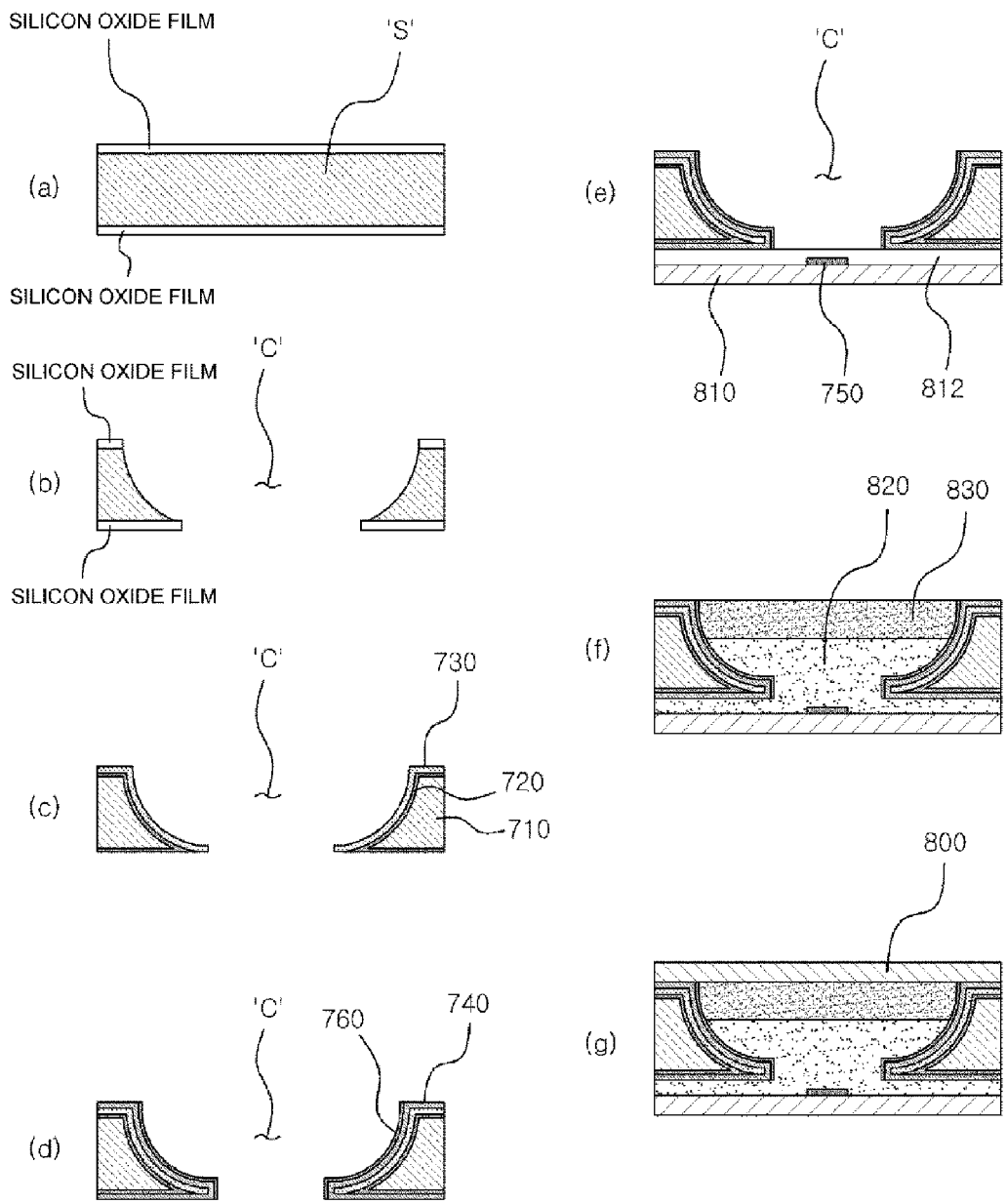
FIG. 11 illustrates cross-sectional views of a sequence of processes for manufacturing the liquid lens according to the second embodiment.

First, the process for producing the container 700 illustrated in (a) to (d) of FIG. 11 are the same as those of the process of producing the container in the first embodiment, and thus, the description thereof is omitted.

Next, referring to (e) of FIG. 11, the fluid pressure plate 810 where the fluid pressure passage 812 and the second electrode 750 are formed is manufactured. The fluid pressure plate 810 according to the embodiment may be produced by using a semiconductor process. It is preferable that the fluid pressure plate is constructed with a substrate made of a material having high light transmittance. FIG. 10 illustrates a perspective view and a cross-sectional view of the fluid pressure plate according to the embodiment. Referring to FIG. 10, the fluid pressure plate includes a lower fluid pressure plate which is a glass substrate, a second electrode 750 which is formed by patterning on the central area of the surface of the lower fluid pressure plate, and an upper fluid pressure plate which is disposed on the lower fluid pressure plate where the second electrode is formed to constitute the fluid pressure passage 812.

After the bottom surface of the cavity is sealed by adhering the fluid pressure plate where the fluid pressure passage is formed to the bottom surface of the container 700, the conductive liquid droplet 820 and the insulating liquid droplet 830 are injected into the cavity of the container 700.

Next, referring to (f) of FIG. 11, the upper substrate 800 which is constructed with an elastic polymer film is adhered to the top surface of the container. The process for producing the upper substrate 800 is the same as the process for producing the upper substrate in the first embodiment, and thus, the description thereof is omitted.

Hereinbefore, in the embodiments, although the liquid lens 1 of which the cavity has a hemispherical shape so as to minimize the applied voltage is exemplified, the present invention may also be applied to a liquid lens where the fluid pressure passage 812 according to the embodiment is formed in a conventional cavity having a cylindrical or truncated conical shape so as to perform the focus adjustment function.

In this manner, in the method of manufacturing the liquid lens 1 according to the embodiment, the container 700 containing the liquid droplets and the fluid pressure plate 810 are formed by using a semiconductor process, it is possible to manufacture the liquid lens having the more precise container 700 and to more easily perform mass production in comparison with a conventional manufacturing method.

INDUSTRIAL APPLICABILITY

A liquid lens according to the present invention may be used as a lens for adjusting focus without a lens driving unit. The liquid lens may be appropriately used as an optical device used for a small-sized, light-weighted camera.

The invention claimed is:

1. A liquid lens capable of adjusting focus based on an electrical signal, comprising:
    a container which has a cavity of which the side cross section has a hemispherical shape and contains an insulating liquid droplet and a conductive liquid droplet which are not mixed in the cavity and have the same density;
    a fluid pressure plate where a fluid pressure passage and a second electrode are formed on a surface thereof and the second electrode is disposed to be in contact with the conductive liquid droplet and which is combined with a bottom surface of the container so that the fluid pressure passage is disposed on a bottom surface of the cavity of the container; and
    an upper substrate which is combined with a top surface of the container to seal a top surface of the cavity of the container,
    wherein the container includes an outer wall where the cavity is formed, a first electrode which is formed on an inner side surface of the outer wall and of which the one end is connected to an external power supply, and a first insulating film which is laminated on a surface of the first electrode and is in contact with the conductive liquid droplet and the insulating liquid droplet, and
    wherein focus adjustment is performed by deformation in a shape of an interface between the insulating liquid droplet and the conductive liquid droplet contained in the cavity in response to a voltage applied from the external power supply through the first electrode and the second electrode and a pressure exerted through the fluid pressure passage.

2. The liquid lens according to claim 1, wherein the curvature of the inner side surface of the outer wall where the cavity of the container is formed is defined as a value so that the meniscus of the insulating liquid droplet and the conductive liquid droplet is minimized.

3. The liquid lens according to claim 1, wherein the amount ratio of the conductive liquid droplet and the insulating liquid droplet contained in the container is defined as a value so that the meniscus of the insulating liquid droplet and the conductive liquid droplet is minimized.

4. The liquid lens according to claim 1, wherein the container further includes a second insulating film interposed between the inner side surface of the outer wall and the first electrode.

5. The liquid lens according to claim 1, wherein the container includes a hydrophobic film which is formed on a contact surface between the first insulating film and the insulating liquid droplet and a contact surface between the first insulating film and the conductive liquid droplet.

\* \* \* \* \*